United States Patent [19]

Nishi et al.

[11] Patent Number: 5,143,979

[45] Date of Patent: Sep. 1, 1992

[54] MOLDING MATERIAL

[75] Inventors: Yoshikatsu Nishi, Yokohama; Masayoshi Oshima, Niiza; Tadao Natsuume, Yokosuka; Teiji Kohara, Kawasaki, all of Japan

[73] Assignee: Nippon Zeon Co., Ltd, Tokyo, Japan

[21] Appl. No.: 540,727

[22] Filed: Jun. 20, 1990

[30] Foreign Application Priority Data

Jun. 24, 1989 [JP] Japan ................................. 1-162422

[51] Int. Cl.$^5$ .............................................. C08F 32/06
[52] U.S. Cl. ................. 525/332.1; 526/281; 526/283
[58] Field of Search ............. 525/332.1; 526/281, 526/283

[56] References Cited

FOREIGN PATENT DOCUMENTS

| | | | |
|---|---|---|---|
| 303246 | 2/1989 | European Pat. Off. | 526/283 |
| 0317262 | 5/1989 | European Pat. Off. | |
| 0367589 | 5/1990 | European Pat. Off. | |
| 2639046 | 11/1989 | France | |

OTHER PUBLICATIONS

Japanese Abstract No. A-60-26024.
Japanese Abstract No. A-1-24826.
Japanese Abstract No. A-63-317520.
European Abstract No. 303,246.
European Abstract No. 317,262.
WPIL, File Supplier, AN=89-072686, Derwent Publications Ltd.
WPIL, File Supplier, AN=88-297373, Derwent Publications Ltd.
WO-A-8 901 953.

*Primary Examiner*—Paul R. Michl
*Assistant Examiner*—LaVonda R. DeWitt
*Attorney, Agent, or Firm*—Armstrong, Nikaido, Marmelstein, Kubovcik & Murray

[57] ABSTRACT

A molding material suitable as an optical material and an optical recording medium formed of the molding material are disclosed. The molding material comprises a hydrogenated product of a polymer formed by ring-opening polymerization of a norbornene-type monomer, the hydrogenated product having a number average molecular weight (Mn) of 20,000 to 50,000, a weight average molecular weight (Mw) of 40,000 to 80,000 and a molecular distribution (Mw/Mn) of not more than 2.5 and having a volatile content of not more than 0.3% by weight.

18 Claims, No Drawings

MOLDING MATERIAL

BACKGROUND OF THE INVENTION

1. Field of the Invention

This invention relates to a molding material suitable as an optical material, and more specifically to a molding material giving a small birefringence and being free from occurrence of voids and silver streaks when used to form an optical transparent substrate by injection molding. This invention also relates to an optical recording medium formed of said material.

2. Related Art

Optical transparent substrates such as an optical disk are shaped generally by injection molding. Such substrates are featured by comparatively small thicknesses such as 1.2 mm but large diameters such as 120 to 300 mm, and require so-called thin-wall precision molding. It is further required to accurately replicate pits and grooves which are as fine as several micrometers.

As a material for that use, hydrogenated products of norbornene-type monomers such as tetracyclododecene and dicyclopentadiene attract attention (JP-A-60-26024, JP-A-61-24826, JP-A-63-317520, EP 303,246 and EP 317,262). The reasons therefor are that these hydrogenated products have excellent transparency and heat resistance, low water absorptivity and low birefringence as well as excellent moldability such as high fluidity and high mold releasability.

However, these hydrogenated products are unsatisfactory as compared with polymethyl methacrylate, although they have much lower birefringence than a polycarbonate. Further, these hydrogenated products have problems that fine voids occur within a substrate formed by injection molding, that a phenomenon causing haze called flash takes place on a substrate surface, and that silver lines called silver streaks are caused.

The present inventors have therefore studied to overcome these problems, and found that these hydrogenated products have varied birefringences depending upon molecular weight and molecular weight distribution, and that low volatiles such as an unreacted monomer, solvent, etc., are contained in conventional hydrogenated products and cause voids, flash, etc. Further, some of antioxidants incorporated into the hydrogenated products have been found to promote the occurrence of voids and silver streaks.

SUMMARY OF THE INVENTION

It is an object of this invention to provide a molding material with a small birefringence which causes no deterioration of mechanical strength and is free from occurrence of voids, silver streaks and flash when used to form a thin optical transparent substrate having a large projected area by injection molding.

It is another object of this invention to provide an optical recording medium produced by forming a recording thin film on a transparent substrate formed of a molding material which has not only such characteristics but also excellent transparency and heat resistance and which is with low water absorptivity and free from occurrence of birefringence.

The present inventors have made a diligent study to attain these objects and found the following: (1) The adjustment of the volatiles in the hydrogenated product of a polymer formed by ring-opening polymerization of a norbornene-type monomer into not more than 0.3% by weight and the control of the molecular weight and molecular weight distribution can make the birefringence low and prevent occurrence of voids and silver streaks, and (2) the addition of an antioxidant having low volatility can overcome problems of decomposition, deterioration and coloring of resins without imparing the characteristics of the hydrogenated product.

The presentors have further found that a molding material obtained as above has excellent optical characteristics and excellently low water absorptivity and high heat resistance, and gives an optical recording medical excellent in various characteristics when an optically writable and/or readable recording thin film is formed on a transparent substrate made of such a molding material.

This invention has been completed on the basis of these findings.

According to this invention, there is therefore provided a molding material which is a hydrogenated product of a polymer formed by ring-opening polymerization of a norbornene-type monomer, which is the hydrogenated product having a number average molecular weight (Mn), measured by high-performance liquid chromatography, of 20,000 to 50,000, a weight average molecular weight (Mw), measured by same, of 40,000 to 80,000 and a molecular weight distribution (Mw/Mn) of not more than 2.5, and which is the hydrogenated product having a volatile content of not more than 0.3% by weight.

According to this invention, there is also provided a molding material comprising 0.01 to 5 parts by weight, based on 100 parts by weight of the above hydrogenated product, of an antioxidant, preferably an antioxidant having a vapor pressure of not more than $10^{-6}$ Pa at 20° C.

Further, according to this invention, there is provided an optical recording medium produced by forming an optically writable and/or readable recording thin film on a transparent substrate formed of the above molding material.

DETAILED DESCRIPTION OF THE INVENTION

The constitution of this invention will be detailed hereinbelow.

(Hydrogenated product of a polymer formed by ring-opening polymerization of a norbornene-type monomer).

The base polymer of this invention is a hydrogenated product of a polymer formed ring-opening polymerization of a norbornene-type monomer.

The hydrogenated product has a number average molecular weight (Mn), measured by highperformance liquid chromatography, of 20,000 to 50,000 a weight average molecular weight (Mw), measured by same, of 40,000 to 80,000 and a molecular weight distribution (Mw/Mn) of not more than 2.5 Further, the volatile content of the hydrogenation product is not more than 0.3% by weight.

When the number average molecular weight (Mn) and the weight average molecular weight (Mw) each are greater than the above range, the resultant molding material gives inferior birefringence, and exhibits poor moldability and low groove replicatability. When the number average molecular weight (Mn) is less than the above lower limit, the resulting molding material gives inferior mechanical strength. When the molecular weight distribution (Mw/Mn) is greater than the above upper limit, the birefringence becomes high.

The volatile content higher than the above range results in a large projected area, and voids and silver streak occur when a thin optical disk substrate, and the like are formed by injection molding.

In view of heat resistance and injection moldability, the hydrogenated product of this invention has a glass transition point (Tg) of not less than 100° C., preferably 120° to 200° C., more preferably 130° to 180° C.

Examples of the norbornene-type monomer are norbornene, dimethanooctahydronaphthalene, trimethanododecahydroanthracene, dicyclopentadiene, 2,3-dihydrodicyclopentadiene, dimethanooctahydrobenzoindene, dimethanodecahydrobenzoindene, dimethanodecahydrofluorene and derivatives thereof. The substituent(s) for said derivatives may be any of hydrocarbon groups and polar groups, e.g. alkyl, alkylidene, aryl, cyano, halogen, alkoxy, carbonyl, pyridyl, etc.

Specific examples of such a norbornene-type monomer are bicyclic compounds such as 5-methyl-2-norbornene, 5,6-dimethyl-2-norbornene, 5-ethyl-2-norbornene, 5-butyl-2-norbornene, 5-ethylidene-2-norbornene, 5-phenyl-2-norbornene, 5-cyclohexyl-2-norbornene, 5-cyano-2-norbornene, 5-methoxycarbonyl-2-norbornene, 5-acetoxy-2-norbornene, 5,6-dimethoxycarbonyl-2-norbornene, 5-chloro-2-norbornene, 5-methyl-2-methoxycarbonyl-2-norbornene and 2-pyridyl-2-norbornene; tricyclic compounds such as dicyclopentadiene, 2,3dihydrocyclopentadiene and substituted compounds of these with alkyl such as methyl, ethyl, propyl, butyl or the like; tetracyclic compounds such as dimethanooctahydronapthalene, 6-methyl-1,4:5,8-dimethano ,1,4,4$a$,5,6,7,8,8$a$-octahydronaphthalene, 6-ethyl-1,4:5,8-dimethano-1,4,4a,5,6,7,8,8a-octahydronaphthalene, 6-ethylidene-1,4:5,8-dimethano-1,4,4a,5,6,7,8,,8-aoctahydronaphthalene, 6-chloro-1,4:5,8-dimethano-1,4,4$a$,5,6,7,8,8$a$-octahydronaphthalene, 6-cyano1:4:5,8-dimethano -1,4,4$a$,5,6,7,8,8$a$-octahydronaphthalene, 6-methoxycarbonyl-1,4:5,8-dimethano-1,4,4$a$,5,6,7,8,8-$a$-octahydronaphthalene, 6-methyl-6-methoxycarbonyl-1,4:5,8-dimethano-1,4,4a,5,6,7,8,8a-octahydronaphthalene, 6-methyl-6-cyano-1,4:5,8-dimethano-1,4,4$a$,5,6,7,8,8$a$-o-ctahydronaphthalene and 6-pyridyl-1,4:5,8-dimethano 1,4,4$a$,5,6,7,8,8$a$-octahydronaphthalene; trimers and tetramers of cyclopentadiene such as 4,9:5,8-dimethano 3$a$,4,4$a$,5,8,8$a$,9,9a-octahydro-1-H-benzoindene, 4,11:5,10:6,9-trimethano-3$a$,4,4$a$,5,5$a$,6,9-,9$a$, 10,10$a$, 11,11$a$-dodecahydro-1H-cyclopentaanthracene, and the like.

These norbornene-type monomers may be used alone or in combination. In order to impart the intended hydrogenated product of a polymer formed by ring-opening polymerization with Tg of not less than 100° C, tetracyclic or pentacyclic compounds of these norbornene-type monomers are used alone or as a main component in combination with bicyclic or tricyclic compounds.

In view of birefringence in particular, tetracyclic, lower alkyl-substituted compounds or alkylidene-substituted compounds are preferred. And, of these compounds, ethyl-substituted, ethylidene substituted and propyl-substituted compounds are preferred. In particular, a homopolymer of an ethylsubstituted or ethylidene-substituted compound, or a copolymer containing, as a polymerization component, not less than 50% by weight, preferably not less than 70% by weight thereof is preferred.

Further, as other copolymerization component, other cycloolefins may be incorporated in such an amount that does not impair the object of this invention, usually in the range of not more than 30% by weight. Examples of the cycloolefins are cyclopropene, cyclobutene, cyclopentene, cycloheptene, cyclooctene, 5,6-dihydrodicyclopentadiene, and the like.

A small amount (up to 10 mole%) of a noncyclic olefin may be used as a molecular weight regulator. $\alpha$-olefins such as 1-butene, 1-pentene, 1-hexene, etc., are particularly preferred.

Such a polymer can be obtained, e.g. by reacting a monomer in the presence of a catalyst system composed of a transition metal compound such as a titanium tetrahalide, organic metal such as an organic aluminum compound, and a tertiary amine. Said monomer is usually added to a reaction system together with said titanium tetrahalide consecutively. Polymers prepared in the presence of other catalyst system may be also used as long as the above requirements are met.

The ring-opening polymerization can be carried out even without any solvent. However, it is usually carried out in an inert organic solvent, examples of which are aromatic hydrocarbons such as benzene, toluene and xylene, aliphatic hydrocarbons such as hexane and heptane, alicyclic hydrocarbons such as cyclohexane, and halogenated hydrocarbons such as dichloroethane. The polymerization is usually carried out at a temperature between −20° C. and 100° C. under a pressure between 0 and 50 kg/cm$^2$.

The hydrogenated product of the polymer formed by ring-opening polymerization of the norbornene-type monomer is produced in the presence of a known hydrogenating catalyst.

As the hydrogenation catalyst, ordinary catalysts for the hydrogenation of olefin compounds are usable. Examples of such catalysts are Wilkinson's complex, cobalt acetate/triethylaluminum, nickel acetylacetate/triisobutylaluminum, palladium-carbon, ruthenium-carbon, and nickel-diatomaceous earth.

The hydrogenation is carried out in a uniform system or nonuniform system under a hydrogen pressure of 1 to 200 atm at 0° to 250° C.

In view of resistance to thermal deterioration, optical deterioration, etc., the hydrogenation ratio is not less than 90%, preferably not less than 95%, particularly preferably not less than 99%.

Method of reduction in volatiles

In general, the hydrogenated product of a polymer formed by ring-opening polymerization of the norbornene-type monomer contains 0.5% by weight or more of volatiles when produced by an ordinary method.

The molding material of this invention is a hydrogenated product of a polymer formed by ring-opening polymerization of the norbornene-type monomer, and has a volatile content of not more than 0.3% by weight, preferably not more than 0.2% by weight, more preferably not more than 0.1% by weight. In this invention, a differential thermogravimetric analyzer (TG/DTA200, supplied by Seiko Denshi Kogyo) was used to determine amounts of reduction in weight when samples were heated from 30° C. to 350° C., and the amounts were regarded as a volatile content.

When the volatile content is more than the above range, thin optical disks with the projected area (a large-sized optical disk substrate in particular) undesirably have voids and silver streaks when formed by injection molding.

The volatiles are reduced, e.g. by the following methods. In a polymer coagulation method by using a poor solvent, coagulation is carried out repeatedly. In a direct drying method, preferably, a thin film dryer or an extrusion dryer is used at not less than 250° C. and not more than 30 Torr. The direct drying method can be also carried out after a solvent solution of the polymer is concentrated into several tens of percentage. It is of course not necessary to limit the reduction method to these.

Polymers (hydrogenated products) produced according to these methods are noncrystalline, excellent in transparency, dimensional stability, heat resistance and show a lower water absorption, and almost free from humidity permeation.

Antioxidant

In this invention, when 0.01 to 5 parts by weight of an antioxidant is incorporated into parts by weight of the above hydrogenation product, it is possible to effectively prevent decomposition and coloring of a polymer when molded.

It is preferable to use an antioxidant having a vapor pressure, at 20° C., of not more than 10-6 Pa, particularly preferably not more than $10^{-8}$ antioxidant having a vapor pressure of more than 10-6 Pa. An evaporates and contaminates a mold and an optical disk surface at a molding time. And, for example, it is difficult to attain high vacuum when a metal is deposited for the formation of a recording thin film, and the interior of an apparatus is contaminated. In addition to these problems, the swelling and peeling of a metal-deposited film are liable to occur.

Examples of the antioxidant usable in this invention are as follows.

HINDERED PHENOL TYPE 2,6-di-t-butyl-4-methylphenol, 2,6-di-t-butylphenol, 4-hydroxymethyl-2,6-di-t-butylphenol, 2,6-di-t-butyl-α-methoxy-p-dimethyl-phenol, 2,4-dit-amylphenol, t-amylphenol, t-butyl-m-cresol, 4-t-butylphenol, styrenated phenol, 3-t-butyl-4-hydroxyanisole, 2,4-dimethyl-6-t-butylphenol, octadecy-3-(3,5-di-t-butyl-4-hydroxyphenyl)propionate, 3,5-di-t-butyl-4-hydroxybenzylphosphonate-diethyl ester, 4,4'-bisphenol, 4,4'-bis-(2,6-di-t-butylphenol), 2,2,'-methylene-bis-(4-methyl-6-t-butyl-butylphenol), 2,2'-methylene-bis-(4-methyl-6-t-butylphenol), 2,2'-methylene-bis-(4-ethyl-6-tbutyl-phenol), 2,2'-methylene-bis-(4-methyl-6-α-methylcryclohexylphenol), 4,4'-methylene-bis-(2-methyl-6-t-butylphenol), 1,1'-methylene-bis-(2,6-di-t-butylnaphthol), 4,4'-butylidene-bis-(2,6,-di-t-butyl-m-cresol), 2,2'-thio-bis-(4methyl-6-t-butylphenol), di-o-cresolsulfide, 2,2'-thio-bis-(2-methyl-6-t-butylphenol), 4,4'-thio-bis-(3-methyl-6-t-butylphenol), 4,4'-thio-bis-(2,3-di-sec-amylphenol), 1,1'-thio-bis(2-napthtol), bis-(3-methyl-4-hydroxy-5-t-butylbenzyl)sulfide, 3,5-di-t-butyl-4 -hydroxybenzyl ether, 1,6-hexanediol-bis-[3-(3,5-di-t-butyl-4-hydroxyphenyl)propionate], 2,4-bis-(n-octylthio)-6-(4hydroxy-3,5-di-t-butylanilano)-1,3,5-triazine, 2,2-thio-diethylenebis[3-(3,5-di-t-butyl-4-hydroxyphenyl)propionate], 2,3-thiobis(4-methyl-6-t-butylphenol), N,N'-hexamethylenebis(3,5-di-t-butyl-4-hydroxy-hydrocinnamamide), bis(3,5-di-t-butyl-b 4-hydroxbenzylphosphanate ethyl)calcium, 1,3,5-triemthyl-2,4,6-tris-(3,5-di-t-butyl-4hydroxybenzyl)benzene, triethyleneglycol-bis-(3-t-butyl-5-methyl-4-1,3,5-trimethyl2,4,6-tris(3,5-di-t-butyl-4-hydroxybenzyl)-benzene, tris-(3,5-di-t-butyl-4-hydroxybenzyl)isocyanurate, pentaerythrityl-tetrakis[3-(3,5-di-t-butyl-4-hydroxyphenyl)propionate, etc.

AMINOPHENOL TYPE n-butyl-p-aminophenol, n-butyroyl-p-aminophenol, n-pelargonoyl-p-aminophenol, n-lauroyl-p-aminophenol, n-stearoyl-p-aminophenol, 2,6-di-tert-butyl-o-dimethyl, amino-p-cresol, etc.

HYDROQUINONE TYPE hydroquinone, 2,5-di-t-butylhydroquinone, 2,5-di-t-amylhydroquinone, hydroquinone methyl ether, hydroquinone monobenzyl ether, etc.

PHOSPHITE TYPE triphosphite, tris(2,4-di-t-butylphenyl)phosphite, tris(nonylphenyl)phosphite, tetrakis(2,4-di-t-butylphenyl)-4,4'-diphenylenephosphonate, 2-ethylhexyloctylphosphite, etc.

OTHERS 2-mercaptobenzothiazol zinc salt, dicatecholborate-di-o-tolylguanidine salt, nickel-dimethyldithiocarbamate, nickel-pentamethylenedithiocarbamate, mercaptobenzimidazole, 2-mercaptobenzimidazole zinc salt, etc.

OPTICAL RECORDING MEDIUM

The molding material of this invention is molded into a variety of articles by an ordinary molding method, and is suitable for use in the production of transparent substrates such as an optical disk substrate by injection molding.

The injection-molded articles can be further coated by vacuum deposition, sputtering, etc., and a monolayer or multilayer film of metal, metal oxide, metal nitride, metal sulfide, metal halide, or the like can be formed depending upon purpose.

A recording medium can be produced by forming an optically writable and/or readable recording thin film on a transparent substrate of the present invention.

The recording material used to form the recording thin film (recording layer) may be freely selected from known rare earth-transition metal amorphous alloys. Examples of the recording material are Tb-Fe alloy (JP-B-57-20691). Dy-Fe alloy (JP-B-57-20692), Cd-Tb-Fe alloy (JP-A-56-126907), Cd-Tb-Dy-Fe alloy (JP-A-57-94948), Cd-Co alloy (JP-A-54-121719), Tb-Fe-Co, and the like. An amorphous layer each of these rare earth-transition metal alloys is formed, desirably, by vapor deposition, sputtering, or ion-plating. The thickness of the amorphous layer is, in general, 500 to 1,500 ÅA.

The recording layer may be formed of a phase change type recording material, such as Ge-Te, Sb-Te, In-Sb, Ge-Sb-Te, and In-Sb-Te. These phase change type materials are formed into a recording layer, desirably, by vapor deposition, sputtering, ion-plating, or the like. The amorphous layer formed therefrom has a thickness, in general, of 500 to 2,000 Å.

An organic dyestuff recording material can be also used. Examples of such a material are methyne. polymethyne types (Cyanine and thiazole-type) (JP-A-58-173696); quinones such as naphthoquinones, anthraquinones (JP-A-59-199291 and 58-112793); phthalocyanine-types (metal phthalocyanines) (JP-A-61-235188 and 59-11292); dithiol-types (dithiol metal complexes) (JP-A-57-11090); and others such as, dioxanes, dithiazines and porphyrins (JP-A-58-197088, 61-235188 and 59-78891). The recording film of each of these organic dyestuff recording materials has a thickness of 500 to 5,000 Å.

A disk molded of the molding material of this invention can be used as a write-once type recording disk by using such a recording material as Te-Cs$_2$, Pb-Te-Se, Te-C, TeO$_2$, Sb-Se or Bi-Te. And, a formchange such as bubble formation may also be used for recording.

A disk molded of the molding material of this invention can be used as a CD, CD-ROM or laser disk by using a reflection mirror of gold, platinum, aluminum, or the like.

The optical recording medium may be provided with a protection layer, reflection layer and dielectric layer between a surface protection layer and the recording layer. Examples of materials for the formation of such a protection layer, etc., are inorganic substances such as CdS, ZnSe, SiO$_2$, Si$_3$N, Si$_3$N$_4$, AlN, TiO$_2$, TaO$_2$ and MgF$_2$, and organic substances such as a UV-curable resin.

Optical disks, etc., are classified into single-plate disks and double-plated disks, and the double-plated disks are grouped into disks formed by attaching two disks directly to each other and sandwich-structured disks are formed by attaching two disks through a spacer. When the disks are bonded to each other, a high-frequency or ultrasonic bonding method is used besides an ordinary adhesive such as a solvent, hot melt or UV-curable adhesive. For the spacer used as described above, it is preferable to use a polymer of the same type as that of the substrate in order to prevent deformation and destruction of the disk which occur due to a dimensional change caused by thermal expansion and humidity adsorption when the disk is used. When a high-frequency or ultrasonic bonding method is used, the spacer can be effectively bonded by a method of changing a copolymerization composition, by a method of adding a plasticizer or hydrocarbon resin thereby to reduce an apparent Tg, by a method of incorporating a dielectric substance or inorganic particles thereby to increase thermal efficiency, or by using these methods in combination.

USE

The molding material of this invention can be processed by a molding method for ordinary thermoplastic resins such as injection molding, press molding, extrusion molding, rotary molding, or the like.

And, the molding material of this invention can be used as a material for the production of an optical disk (substrate, hub, spacer, etc.), lens, glass fiber, sealing material for LED, various covering glass, window glass, water tank of an iron, utensiles for use with a microwave oven, substrate for liquid crystal display, printing board, transparent electrically conductive sheet and film, injector, pipet, animal cages, housings for various instruments, film, helmet, etc. Concerning the optical recording medium, it can be used as a material for an optical disk, CD, CD-ROM, laser disk, optical card, optical floppy disk, optical tape, etc.

According to this invention, there is provided a molding material having excellent performance as an optical material. In particular, an optical transparent substrate formed by injection-molding the molding material of this invention is free from deterioration of mechanical strength and occurrence of voids and silver streaks.

Further, the transparent substrate formed of the molding material of this invention can give an optical recording medium having excellent durability, etc.

EXAMPLES

This invention will be illustrated below by reference to Examples and Comparative Examples. However, the scope of this invention shall not be limited to these Examples. In Examples and Comparative Examples, "part" stands for "part by weight" and "%" for "% by weight" unless otherwise specified.

EXAMPLE 1

Production of a polymer by ring-opening polymerization

Under nitrogen atmosphere, a 200-liter reactor was charged with 70 parts of dehydrated toluene, 0.5 part of triethylaluminum, 1.4 parts of triethylamine and 0.15 part of 1-hexene. While the temperature inside the reactor was maintained at 20° C., 30 parts of ethyltetracyclododecene (ETD) and 0.17 part of titanium tetrachloride were continuously added to the reaction system over 1 hour to carry out a polymerization reaction. After the ETD and titanium tetrachloride were all added, the reaction was continued for 1 hour. The reaction was stopped by adding an isopropyl/ammonia water (0.5 part/0.5 part) mixed solution, and then, the resultant polymer was added to 500 parts of isopropyl alcohol to coagulate the polymer. The coagulated polymer was dried under vacuum at 60° C. for 10 hours to give 25.5 parts of a polymer formed by ring-opening polymerization, the yield of which was 85%.

The polymer was subjected to high-performance liquid chromatography (HLC) analysis using toluene as a solvent (HCL802L, supplied by Toso Co., Ltd., which had a column of TSK gel G500H-G4000H; temperature: 38° C., flow rate: 1.0 ml/minute) to measure its molecular weight (in terms of polystyrene), which was as follows: Mn: $2.9 \times 10^4$, Mw: $6.1 \times 10^4$, Mw/Mn: 2.1.

Production of hydrogenation product

The above polymer was dissolved in 150 parts of cyclohexane, and hydrogenated in the presence of 0.6 part of a palladium/carbon catalyst (amount of supported palladium: 5%) in a 500-liter autoclave under a hydrogen pressure of 70 kg/cm$^2$ at a temperature of 140° C. for 4 hours. The hydrogenating catalyst was filtered off, and the reaction solution was divided into five equal portions. These portions were coagulated by adding them to 130 parts of isopropyl alcohol, respectively. The resultant hydrogenated products were dried under vacuum at 60° C. for 10 hours, and respectively redissolved in cyclohexane to form 10% solutions. The 10% solutions were respectively dissolved in 130 parts of isopropyl alcohol to recoagulate them. This procedure was repeated once more to carry out the drying and coagulation. Then, the resultant hydrogenated products were dried under vacuum at 90° C. for 48 hours, respectively, whereby 22.6 parts of each of the hydrogenated products were obtained.

The hydrogenation ratios of the hydrogenated products, measured by $^1$H NMR spectral analysis, were not less than 99%. Their molecular weights measured by HLC analysis were as follows: Mn: $2.9 \times 10^4$, Mw: $6.2 \times 10^4$ and Mw/Mn: 2.1.

The glass transition temperature (Tg) thereof were measured by DSC analysis. The volatile contents thereof were determined by measuring amounts of reduction in weight from 30° C. to 350° C. by thermogravimetric analysis (TGA) under nitrogen atmosphere at a temperature elevation rate of 10° C./minute.

CONTROL

For comparison, the procedures of the polymerization and hydrogenation were repeated in the same way as in Example 1, and then, the resultant hydrogenated products were treated in the same way as in Example 1 except that the coagulation was carried out only once to give five hydrogenated products.

The hydrogenated products had a hydrogenation ratio of not less than 99%, and the following molecular weight: Mn: $3.0 \times 10^4$, Mw: $6.2 \times 10^4$ and Mw/Mn: 2.1. All the results are shown in Table 1.

TABLE 1

|  | Experiment No. | Tg (°C.) | Volatile content (%) |
|---|---|---|---|
| The invention | 1 | 142 | <0.1 |
|  | 2 | 142 | <0.1 |
|  | 3 | 141 | 0.1 |
|  | 4 | 141 | 0.1 |
|  | 5 | 142 | <0.1 |
| Control | 6 | 138 | 0.6 |
|  | 7 | 137 | 0.8 |
|  | 8 | 139 | 0.6 |
|  | 9 | 135 | 1.1 |
|  | 10 | 140 | 0.5 |

EXAMPLE 2

Preparation of pellets

Antioxidants shown in Table 2 were respectively added to 100 parts of hydrogenated products of a polymer formed by ring-opening polyermization which were the same as those obtained in Example 1 and had a low volatile content. And, in each case, these components were mixed in a Hanschel mixer, and then pelletized with an extruder at 230° C.

Preparation of optical disks

The above pellets were respectively injection-molded by using an injection molding machine (DISC 5 MIII, supplied by Sumitomo Heavy Industries, Ltd.) at a resin temperature of 330° C. and a mold temperature of 110° C. to form optical disk substrates having a diameter of 130 mm and a thickness of 1.2 mm. All of the substrates had a light transmissivity of not less than 90%.

These optical disk substrates were examined or measured concerning appearance (gross observation), molecular weight (Mw) change ratio, voids (by microscopic observation), birefringence (radious within 25 to 60 mm), and colored state after heating them in an oven at 110° C. for 48 hours (by the eyes). Table 2 shows the results.

For comparison, hydrogenation products of a polymer formed by ring-opening polymerization obtained in the same manner as in controls of Example 1, and having a high volatile content were treated in the same way as above to form optical disk substrates. Table 2 also shows the results of the examination and measurement of these.

TABLE 2

|  |  |  |  |  | Volatile content (%) | Antioxidant | | Evaluation of optical disk substrates | | | | |
|---|---|---|---|---|---|---|---|---|---|---|---|---|
|  |  | Mn × $10^4$ | Mw × $10^4$ | Mw/Mn |  | Name | Amount (part) | Appearance (examined by the eyes) | Mw reduction ratio (%) | Microvoid | Birefringence (nm) | Coloring |
| The invention | 1 | 2.9 | 6.1 | 2.1 | <0.1 | — | 0 | No failure | 1 | No | <20 | Slightly colored in yellow |
|  | 2 | 2.9 | 6.1 | 2.1 | <0.1 | A | 0.2 | No failure | <1 | No | <20 | Colorless |
|  | 3 | 2.9 | 6.1 | 2.1 | <0.1 | B | 0.2 | No failure | <1 | No | <20 | Colorless |
|  | 4 | 3.0 | 6.2 | 2.1 | <0.1 | C | 0.2 | No failure | <1 | No | <20 | Colorless |
|  | 5 | 3.0 | 6.2 | 2.1 | <0.1 | D | 0.2 | No failure | <1 | No | <20 | Colorless |
|  | 6 | 2.9 | 6.2 | 2.1 | 0.1 | E | 0.2 | No failure | <1 | No | <20 | Colorless |
|  | 7 | 2.9 | 6.2 | 2.1 | 0.1 | F | 0.2 | No failure | <1 | No | <20 | Colorless |
| Control | 8 | 3.0 | 6.2 | 2.1 | 0.5 | — | 0 | No failure | 1 | voids having size of 10 μm or less in circumferential area | <20 | Slightly colored in yellow |
|  | 9 | 3.0 | 6.2 | 2.1 | 0.7 | A | 0.2 | No failure | <1 | voids having size of 10 μm or less in circumferential area | <20 | Colorless |
|  | 10 | 3.0 | 6.2 | 2.1 | 1.0 | B | 0.2 | bubbles in circumferential area | <1 | voids having size of 100 μm or less in circumferential area | <20 | Colorless |

A: Pentacrythrityl-tetrakis[3-(3,5-di-t-butyl-4-hydroxyphenyl)propionate (vapor pressure $1.3 \times 10^{-10}$ Pa) = IRGANOX 1010
B: 1,3,5-trimethyl-2,4,6-tris(3,5-t-butyl-4-hydroxybenzyl)benzene (vapor pressure $1.3 \times 10^{-12}$ Pa) = IRGANOX 1330
C: 2,4-bis-(n-octylthio)-6-(4-hydroxy-3,5-di-t-butylanilino)-1,3,5-triazine (vapor pressure $1.3 \times 10^{-8}$ Pa) = IRGANOX 565
D: 2,5-di-t-amylhydroquinone (vapor pressure $10^{-9}$ Pa or less) = Noclac DAH
E: tris(2,4-di-t-butylphenyl)phosphite (vapor pressure $1.3 \times 10^{-8}$ Pa) = IRGANOX 168
F: 2,2-thio-diethylenebis[3-(3,5-di-t-butyl-4-hydroxyphenyl)propionate (vapor pressure $1.3 \times 10^{-9}$ Pa) = IRGANOX 1035

As is clear from Table 2, the optical disk substrates of this invention had a low birefringence and were free from occurrence of microvoids and silver streaks. Further, when an antioxidant was incorporated, the molding material of this invention was free from a decrease in molecular weight at a molding time, and did not cause cooling for a long period of time. In contrast, the molding material having a high volatile content, shown as controls, caused microvoids in circumferential areas of the resultant optical disks, and bubbles also occurred in one of the disks, which defects are serious when large-sized optical disk substrates are produced.

EXAMPLE 3

Example 1 was repeated except that tetracyclodecene (TCD), methyltetracyclodecene (MTD), dicyclopentadiene (DCP) and norbornene (NB) were used in a combination and compositional ratio as shown in Table 3 in place of the monomer ETD, whereby hydrogenated products of polymers formed by ring-opening polymerization were obtained. An antioxidant (Irganox 1010) was incorporated into each of the hydrogenated paroducts and optical disk substrates were formed in the same way as in Example 2. Then, the substrates were examined and measured for various properties. Table 3 shows the results.

For comparison, polymers which did not meet the molecular weight or molecular weight distribution requirement were prepared in the following manner, and evaluated similarly. Table 3 also shows the results.

EXPERIMENTS NOS. 7-9 IN TABLE 3

Experiment No. 7

Under nitrogen atmosphere, a 30-liter reactor was charged with 70 parts of dehydrated toluene, 30 parts of ETD and 0.15 part of 1-hexene. While the temperature inside the reactor was maintained at 20° C., 0.5 part of triethylaluminum, 1.4 parts of triethylamine and 0.17 part of titanium tetrachloride were added to carry out polymerization. Due to exothermic heat of the polymerization, the reaction system temperature was increased up to 68° C. at maximum in 2 minutes after the catalyst was added. Thereafter, the temperature was decreased gradually. After the reaction was continued for 1 hour, the reaction was stopped by adding an isopropyl alcohol/ammonia water (0.5 part : 0.5 part) mixed solution. The resultant product was added to 500 parts of isopropyl alcohol to give a coagulation product. The coagulation product was dried in the same way as in Example 1 to give 11.7 parts of a polymer formed by ring-opening polymerization. The yield thereof was 39%.

The polymer was dissolved in 110 parts of hexane. And, 0.3 part of a palladium/carbon catalyst was added, and the hydrogenation thereof was carried out under the same conditions as those described in Example 1. The hydrogenating catalyst was filtered off, and the resultant product was coagulated in isopropyl alcohol three times in the same way as in Example 1 to give 9.5 parts of a hydrogenated product. The hydrogenation ratio thereof was not less than 99%.

Experiment No. 8

Under nitrogen atmosphere, a 30-liter reactor was charged with 70 parts of dehydrated toluene, 30 parts of ETD, 0.15 part of 1-hexene, 0.5 part of triethylaluminum and 1.4 parts of triethylamine. While the temperature inside the reactor was maintained at 20° C., 0.17 part of titanium tetrachloride was continuously added over 1 hour to carry out polymerization. After the total amount of the titanium tetrachloride was added, the reaction was continued for 1 hour. In the same way as in Example 1, the reaction was stopped and the resultant product was coagulated and dried to give 26.1 parts of a polymer formed by ringopening polymerization. The yield thereof was 87%.

The polymer obtained above was dissolved in 230 parts of cyclohexane, and hydrogenated in the presence of 0.67 part of a palladium/carbon catalyst under the same conditions as those in Example 1. The resultant product was post-treated in the same way as in Example 1 to give 21.7 parts of a hydrogenated product. The hydrogenation ratio thereof was not less than 99%.

Experiment 9

Example 1 was repeated except that 1.0 part of 1-hexene was used, whereby a 13.2 parts of a polymer formed by ring-opening polymerization was obtained. The yield of the polymer was 44%.

The polymer was dissolved in 120 parts of cyclohexane, and hydrogenated in the presence of 0.33 part of a palladium/carbon catalyst under the same conditions as those in Example 1. The resultant product was post-treated in the same way as in Example 1 to give 10.9 parts of a hydrogenated product. The hydrogenation ratio thereof was not less than 99%.

TABLE 3

| Experiment No. | | Monomer Name | Composition (weight ratio) | $Mn \times 10^4$ | $Mw \times 10^4$ | Mw/Mn | Tg (°C.) | Volatile content (%) | Antioxidant Name | Amount (part) |
|---|---|---|---|---|---|---|---|---|---|---|
| The invention | 1 | TCD/NB | 8/2 | 2.6 | 5.7 | 2.2 | 126 | <0.1 | A | 0.2 |
| | 2 | TCD/DCP | 8/2 | 2.8 | 6.4 | 2.3 | 137 | <0.1 | A | 0.2 |
| | 3 | ETD/DCP | 9/1 | 2.8 | 5.9 | 2.1 | 134 | <0.1 | A | 0.2 |
| | 4 | MTD | — | 3.0 | 6.2 | 2.1 | 152 | <0.1 | A | 0.2 |
| | 5 | MTD/NB | 8/2 | 2.7 | 5.9 | 2.2 | 129 | <0.1 | A | 0.2 |
| | 6 | MTD/DCP | 8/2 | 2.9 | 6.1 | 2.1 | 140 | <0.1 | A | 0.2 |
| Control | 7 | ETD | — | 6.1 | 16.0 | 2.6 | 147 | <0.1 | A | 0.2 |
| | 8 | ETD | — | 1.8 | 8.7 | 4.6 | 141 | <0.1 | A | 0.2 |
| | 9 | ETD | — | 1.8 | 3.9 | 2.2 | 136 | <0.1 | A | 0.2 |

| | Experiment No. | Evaluation of optical disk substrate | | | |
|---|---|---|---|---|---|
| | | Appearance (Gross observation) | Mw reduction ratio (%) | Micro-void | Birefringence (nm) |
| The invention | 1 | No failure | <1 | None | <30 |
| | 2 | No fialure | <1 | None | <35 |
| | 3 | No failure | <1 | None | <15 |
| | 4 | No failure | <1 | None | <25 |
| | 5 | No failure | <1 | None | <20 |
| | 6 | No failure | <1 | None | <20 |
| Control | 7 | Poor groove | 1 | None | 40–150 |

TABLE 3-continued

| | | | | |
|---|---|---|---|---|
| 8 | Crack occurred in the vicinity of a gate when a mold was released. | <1 | None | <40 |
| 9 | Crack occurred in the vicinity of a gate when a mold was released. Fragile | <1 | None | <15 |

Table 3 shows that those having Mn, Mw and Mw/Mn coming under the scope of this invention were excellent in birefringence, free from occurrence of microvoids, and excellent in groove replicatability. In contrast, the polymer having a large Mn and Mw had inferior birefringence, poor moldability and poor groove replicatability. Further, the polymer having a low Mn had inferior mechanical properties, and the polymer having a large Mw/Mn showed higher birefringence.

EXAMPLE 4

Example 1 was repeated except that ETD was replaced with a mixed monomer of cyclopentadiene trimer (3C: octahydrodimethanobenzoindene) and DCP (mixing ratio 3C : DCP =50 : 50) as a norbornene-type monomer, whereby a polymer formed by ring-opening polymerization and a hydrogenated product (having a hydrogenation ratio of nearly 100%) were obtained. And, a transparent substrate was similarly prepared. In addition, an antioxidant IRGANOX 1010 was added in an amount of 1 part based on 100 parts of the polymer.

The hydrogenated product had a Tg of 137° C. and the following molecular weight: Mn: $2.6 \times 10^4$, Mw: $5.8 \times 10^4$ and Mw/Mn: 2.2. The volatile content thereof was less than 0.1%, and the transparent substrate had a light transmissivity of not less than 90%.

EXAMPLE 5

Optical disk substrates prepared from materials shown in Table 4 were subjected to ultrasonic cleaning with isopropyl alcohol in a clean room, and dried with freon vapor. Then, a rare earth-transition metal amorphous perpendicular magnetic film having a thickness of 1,000 Å and a silicon oxide protective film having a thickness of 1,500 Å were formed on each of the substrates by using an RF magnetron sputtering apparatus supplied by Nippon Shinku Gijutsu Co., Ltd.

The resultant optical disks were tested on various physical properties. Table 4 shows the results.

MEASUREMENT OF PHYSICAL PROPERTIES

C/N ratio

The C/N values of the optical disks were measured under the following conditions.

| | |
|---|---|
| Writing laser power | 5.5 mW |
| Reading laser power | 1.0 mW |
| Disk turning rate | 1,800 rpm |
| Carrier frequency | 2 MHz |
| Applied magnetic field | 300 Oe |
| Laser wavelength | 830 nm |

Durability Test

The optical disks were placed in a 60° C. constant-temperature and 80 %RH constant-humidity chamber, and their C/N values and warpage were measured after predetermined periods of time.

Warpage Measurement

A warpage angle automatic measuring apparatus supplied by Nippon Kogakusha was used to measure warpage (mrad).

Mechanical Strength

The optical disks were dropped from a height of 1 m, and observed to see whether they had suffered crack and breakage.

TABLE 4

| | | | Durability | | | | | Mechanical |
|---|---|---|---|---|---|---|---|---|
| | | (Time) | 0 | 10 | 100 | 1000 | 2000 | strength |
| The invention | ETD polymer *1 | C/N | 49 3.0 | 49 3.0 | 49 2.9 | 49 3.1 | 49 3.1 | No change |
| | MTD/NB copolymer *2 | C/N | 49 3.5 | 49 3.5 | 49 3.5 | 49 3.3 | 49 3.2 | No change |
| Control | Poly-carbonate *3 | C/N | 47 2.5 | 47 8.0 | 47 25 | 45 16 | 40 14 | No change |
| | Polymethyl methacrylate *4 | C/N | 46 3.2 | 45 21 | impossible to measure | — — | — — | No change |
| | glass *5 | C/N | 47 1.3 | 47 1.3 | 47 1.3 | 47 1.3 | 47 1.3 | Cracked |

*1: Experiment No. 1 in Example 1
*2: Experiment No. 5 in Example 3
*3: Panlite supplied by Teijin Kasei Co., Ltd.
*4: Acrypet supplied by Kyowa Gas Chemical Co., Ltd.
*5: Direct groove type 130 mmφ substrate supplied by Asahi Glass Co., Ltd.

EXAMPLE 6

A spacer was prepared in the following manner, and an optical disk having an air sandwich structure was produced.

0.1 Part of titanium oxide was added to and mixed with 100 parts of the MTD/NB copolymer (MTD:NB = 8:2, Tg =129° C.) obtained in Experiment No. 6 in Example 3, and these components were kneaded with a kneader under nitrogen atmosphere at 220° C. for 30 minutes.

The resultant resin composition was injection-molded into an inner circumferential spacer having a thickness of 0.4 mm, and inner diameter of 125 mm and an outer diameter of 130 mm and an outer circumferential spacer having a thickness of 0.4 mm, an inner diameter of 15 mm and an outer diameter of 36 mm under the same conditions as those for the production of optical disk substrates described in Example 2.

Optical disks formed of a hydrogenated ETD polymer (Tg = 142° C.) were bonded through the two spacers with a UV-curable epoxy adhesive (bisphenol A type epoxy/sulfonium salt system, cure time = 15 seconds).

TABLE 5

| Substrate polymer | Spacer composition | Durability | | | | |
| --- | --- | --- | --- | --- | --- | --- |
| | | Before test | | After test | | |
| | | Adhesion | Water Absorptivity | Adhesion | Change in birefringence | Deformation |
| ETD polymer | MTD/NB polymer | good | 0.01> | good | No | No |
| Polymethyl methacrylate | Polymethyl methacrylate | good | — | Poor to some extent | High to some extent | Yes |
| Polycarbonate | Polycarbonate | good | — | good | high | slightly deformed |

EXAMPLE 7

The MTD polymer (Tg = 152° C.) of Experiment No. 4 in Example 3 (Table 3) was press-molded into a square sheet having a width of 10 cm and a thickness of 0.6 mm, and an ITO film having a thickness of 3,000 Å was formed by using an RF magnetron sputtering apparatus (supplied by Nippon Shinku Gijutsu Co., Ltd.) with an alloy target of $In_2O_3/SnO_2$ (90:10). The resultant sheet was a transparent electrically conductive sheet having a 700 nm light transmissivity of 81% and a specific resistance of $2 \times 10^{-3} \Omega.cm$.

A 0.01 mm thick cast film of the above MTD polymer was formed on a platinum electrode, and subjected to electrolytic polymerization using an acetonitrile solution of pyrrole and tetraethylammonium tetrafluoroborate as an electrolytic solution, whereby there was obtained a transparent electrically conductive film having a light transmissivity of 63% and a specific resistance of 39 1.cm.

EXAMPLE 8

The MTD/NB polymer (Tg = 129° C.) of Experiment No. 5 in Example 3 (Table 3) was press-molded into a square plate having a width of 10 cm and a thickness of 0.1 cm, and electrolytic copper foil was thermally fused at 280° C. and attached to both the surfaces thereof to form a high-frequency circuit substrate.

The substrate had a dielectric constant of 2.2, a dielectric loss of $4.4 \times 10^{-4}$ and a peel strength of 1 kg/cm.

We claim:

1. A molding material comprising a hydrogenated product of a polymer formed by ring-opening polymerization of a norbornene-type monomer, the hydrogenated product having a number average molecular weight (Mn), measured by high-performance liquid chromatography, of 20,000 to 50,000, a weight average molecular weight (Mw), measured by the same, of 40,000 to 80,000 and a Mw/Mn ratio of not more than 2.5 and having a volatile content of not more than 0.3% by weight.

2. A molding material according to claim 1, wherein the hydrogenated product has a glass transition point (Tg) of not less than 100° C.

3. A molding material according to claim 2, wherein the hydrogenated product has a hydrogenation ratio of not less than 90%.

4. A molding material according to claim 2, wherein the hydrogenated product has a volatile content of not more than 0.2% by weight.

5. A molding material according to claim 2, wherein the hydrogenated product has a hydrogenation ratio of not less than 95% and a volatile content of not more than 0.1% by weight.

6. A molding material according to claim 5, wherein the hydrogenated product has a glass transition point (Tg) of 120 to 200° C.

7. A molding material according to claim 1, wherein the norbornene-type monomer is comprised of a tetracyclic norbornene-type compound as a main component.

8. A molding material according to claim 1, wherein the norbornene-type monomer is a compound having a substituent of a lower alkyl or alkylidene group.

9. A molding material according to claim 8, wherein the substituent is a $C_2$-$C_3$ alkyl or alkylidene group.

10. A molding material according to any one of claim 1 to 9, which further comprises 0.01 to 5 parts by weight, per 100 parts by weight of the hydrogenated product, of an antioxidant having a vapor pressure, at 20° C., of not more than $10^{-6}$ Pa.

11. A molding material according to claim 10, wherein the antioxidant has a vapor pressure of not more than $10^{-8}$ Pa.

12. A molding material according to claim 11, wherein the antioxidant is a hindered phenol type, aminophenol type, hydroquinone type, or phosphite type.

13. An optical disk substrate formed of the molding material recited in any one of claims 1 to 9.

14. An optical recording medium produced by forming an optically writable and/or readable recording thin film on a transparent substrate formed of the molding material recited in any one of claims 1 to 9.

15. An optical disk substrate formed by injection molding the molding material recited in claim 1.

16. An optical recording medium produced by forming an optically writable and/or readable recording thin film on a transparent substrate by injection molding of the molding material recited in claim 1.

17. A molding material according to claim 1, produced by reacting a monomer in the presence of a catalyst system comprised of a transition metal compound, an organic metal and a tertiary amine.

18. A molding material according to claim 17, wherein the hydrogenated product is obtained after repeated coagulation.

* * * * *